(12) United States Patent
Hardt et al.

(10) Patent No.: US 8,668,419 B2
(45) Date of Patent: Mar. 11, 2014

(54) SHEARABLE FASTENING DEVICE WITH FORCE TRANSMISSION ELEMENT

(75) Inventors: Falk Hardt, Muenchberg (DE); Volker Markgraf, Roeslau (DE); Gert Stauch, Hof (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/999,521

(22) Filed: Dec. 5, 2007

(65) Prior Publication Data

US 2012/0328388 A1 Dec. 27, 2012

(30) Foreign Application Priority Data

Dec. 12, 2006 (EP) .................................... 06301241

(51) Int. Cl.
*F16B 31/00* (2006.01)
(52) U.S. Cl.
USPC .................................................. 411/5; 411/2
(58) Field of Classification Search
USPC .................. 411/1–3, 5, 8, 403, 407; 439/797; 81/438, 451, 452
See application file for complete search history.

(56) References Cited

U.S. PATENT DOCUMENTS

| 1,007,107 | A | * | 10/1911 | Hulsmann | 81/447 |
| 4,911,593 | A | * | 3/1990 | Kephart | 411/403 |
| RE36,797 | E | * | 8/2000 | Eggert et al. | 81/438 |
| 6,176,659 | B1 | * | 1/2001 | Hardt et al. | 411/5 |
| 6,321,624 | B1 | * | 11/2001 | Croton et al. | 81/124.7 |
| 6,620,167 | B2 | * | 9/2003 | Deslauriers et al. | 606/308 |
| 6,644,150 | B2 | * | 11/2003 | Chen | 81/438 |
| 6,820,727 | B1 | * | 11/2004 | Theiss et al. | 188/73.32 |
| 6,988,432 | B2 | * | 1/2006 | Brooks | 81/439 |
| 8,317,443 | B2 | * | 11/2012 | Stauch et al. | 411/5 |

FOREIGN PATENT DOCUMENTS

| DE | 4113242 | 10/1992 | F16B 31/02 |
| DE | 2295871 | 6/1996 | H01R 4/30 |
| DE | 19960198 | 6/2001 | F16B 31/02 |
| EP | 0692643 | 1/1992 | H01R 4/30 |
| EP | 0984176 | 3/2000 | F16B 31/02 |

OTHER PUBLICATIONS

European International Search Report—Apr. 30, 2007.

* cited by examiner

*Primary Examiner* — Gary Estremsky
(74) *Attorney, Agent, or Firm* — Sofer & Haroun, LLP

(57) ABSTRACT

A shearable fastening device (1) has a shearable fastener (2) having a plurality of screwthreaded portions (3), a head portion (4) which is connected to the screws threaded portions (3) via a first predetermined weakening (5) and further predetermined weakenings (6) in the form of cross-section constrictions are provided between the screwthreaded portions (3), as well as an internal recess (7), wherein the internal recess (7) extends from the head portion (4) at least into the region of the predetermined weakenings (6). At least one stepped predetermined weakening (8) is formed by its shear-off torque (aNm) being smaller than that of the next predetermined weakening further away from the head portion (4) and the shear-off torque (aNm+1) at the next predetermined weakening closer to the head portion (4) rising again with respect to the shear-off torque (aNm) of the stepped predetermined weakening (8). The shear-off torque of the predetermined weakenings (6) on the portions without the stepped predetermined weakening (8) increases continuously in the direction of the head portion (4), and a force transmission element (9) is insertable into the internal recess (7) of the shearable fastener (2). The force transmission element (9) in the inserted condition extends from the head portion (4) so far into the internal recess (7) such that the force transmission element (9) bridges the stepped predetermined weakening (8).

9 Claims, 3 Drawing Sheets

SHEARABLE FASTENING DEVICE WITH FORCE TRANSMISSION ELEMENT

RELATED APPLICATION

This application claims the benefit of priority from European Patent Application 06 301 241.3, filed on Dec. 12, 2006, the entirety of which is incorporated by reference.

FIELD OF THE INVENTION

The present invention relates to a shearable fastening device.

BACKGROUND

For connecting, branching off and plugging of cables, in particular underground cables, screw connectors, cable connecting clamps or cable lugs are conventionally used, into which shearable fasteners are inserted for fixing or contacting of the conductors, respectively.

A shearable fastener usable for multi range cable connectors is described in the applicant's patent EP 0 984 176 B1. The biggest conductor cross section is clamped with the biggest turning moment respectively the biggest force. Smaller cross sections are installed by using a reduced force.

However there are two major disadvantages of the above mentioned conventional fastener concerning its function. Firstly, for the installation of the fastener two different tools may be necessary: an Allen key for big conductor cross sections and a hexagon socket wrench for smaller conductor cross sections. This implies that the installation can be cumbersome for a technician, particularly when installing the shearable fastener in places with limited space and/or at difficult angles. Secondly the range of conductor cross sections of the screwing connector is usually limited by the length of the Allen key (commonly 19 mm). Therefore certain types of shearable fasteners cannot be installed for certain types of conductors thus generating a limiting factor for the applicability of the shearable fastener.

GB-2 295 871-A describes a screw shank for exerting a clamping force on one of a series of objects of known sizes, e.g. an electrical conductor received in a connector. The screw shank comprises an external screwthread so that rotation of the shank by drive means including a drive rod which is inserted into an internal recess of the screw shank screws it into the conductor. The shank is formed with a series of weakened sections spaced along the screwthread such that when a predetermined torque is reached, one of the weakened sections lies in the plane of the surface of the article to encourage the shank to shear in that plane. This device has the drawback that the shearing plane is defined by the length of the drive means: firstly the extension into the internal recess, secondly the outer extension of the skirt. Therefore, if a soft conductor with a small cross section is to be clamped, the screw shank will extend very far into the bore while the drive rod's extension into the internal recess of the screw shank is limited by its construction, i.e. it will stay in a plane which is quite far away from the appropriate shearing plane since it doesn't move forward with the screw shank but only rotate in a final position. Thus with this screw shank it is likely that the shearing takes place in the wrong shearing plane exerting a wrong clamping force on the conductor.

OBJECTS AND SUMMARY

It is therefore an object of the present invention to provide a shearable fastening device which overcomes the above mentioned disadvantages and which is easy and flexible to use while providing an optimal clamping and shearing functionality for a wide variety of different cross-sections of cable conductors.

Through the combined use of the force transmission element together with the shearable fastener the use of two different tools for clamping can be avoided. Additionally the size of the Allen wrench tool is no longer limiting the usage of the shearable fastener. Through the extension of the force transmission element over the stepped predetermined weakening it is ensured that the correct clamping torque is applied at the correct shearing plane.

Advantageously the head portion of the shearable fastener comprises a tool engagement surface, preferably in the form of a hexagon head. This ensures an optimal force transmission from the tool, e.g. a wrench size 17 or 19, to the screw.

Preferably the internal recess of the shearable fastener in a region extending from the head portion and the force transmission element each comprise a cross section for an optimal force transmission between each other. The preferred cross section is a hexagonal cross section. Of course other cross sections for tools known to the person skilled in the art like Torx® or the like may be used. It must be noted that while an optimal force transmission and engagement are to be achieved, a certain clearance must as well be provided for an acceptable handling of the shearable fastening device.

With an advantage the distance between the predetermined weakenings is arbitrary. Correspondingly the predetermined weakenings of the shearable fastener can be flexibly and exactly adapted to the cross-sections of the cable conductors which, according to standardization, do not alter continuously, but step-wise.

Advantageously the shearable fastener comprises three to ten, preferably four to eight predetermined weakenings, at least one of which is constructed as a stepped predetermined weakening. This provides a considerable flexibility and adaptability of the shearable fastener to a variety of fields of application, in particular to the most various conductor cross-sections that can be clamped safely by means of the shearable fastening device according to the invention, and the breakaway-head shears off at the correct predetermined weakening.

With a further advantage there is a holding member located the internal recess of the shearable fastener securing the position of the force transmission element in the internal recess of the shearable fastener. Alternatively a holding member is located on the force transmission element. Preferably the holding member is made of metal or plastic and fastened with fixing means such as a thread, a sealant (e. g. Mastic) or an adhesive. The shearable fastening device can be equipped such that the force transmission element is already inserted into the internal recess of the shearable fastener at delivery. This ensures the correct position of the force transmission element and a dropping out of the force transmission element can be avoided. Furthermore the holding element ensures that force transmission element does not slide out of the internal recess at the beginning of an installation. When the weakest predetermined weakening has sheared off, the holding element guarantees that the head portion which is already broken away is held together with the force transmission element. Thus it can be avoided that the head portion is lost during the mutual turning of the shearable fastening device.

BRIEF DESCRIPTION OF THE DRAWINGS

Further details, features and advantages of the invention result from the following description with reference to the drawings.

DETAILED DESCRIPTION

Figure 1:
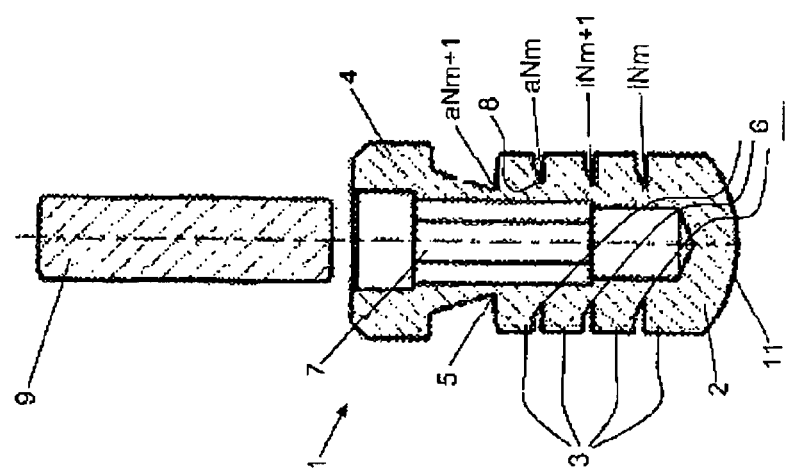
FIG. 1 shows a sectional view of a first embodiment of the shearable fastening device according to the invention with the force transmission element not being inserted into the internal recess.

FIG. 1 illustrates a first embodiment of the shearable fastening device 1 according to the invention in a sectional view. The shearable fastener 2 comprises a plurality of screwthreaded portions 3 and a head portion 4. Between the head portion 4 and the closest screwthreaded portion 3 a first predetermined weakening 5 is provided. Between the screwthreaded portions 3, further predetermined weakenings 6 are provided. The screwthreaded portions 3 may be of varying height or strength, respectively. The lowest screwthreaded portion furthermore comprises a cable contacting face 11 which then effects the clamping when the shearable fastener has been screwed in.

The construction of the predetermined weakening results as follows. As shown, the shear-off torques iNm, iNm+1, aNm and aNm+1 result at the individual predetermined weakenings 6 or the first predetermined weakening 5, respectively. The arrangement has to be understood such that the "+1" indicates that this shear-off torque increases as compared to or is larger than the previous shear-off torque, respectively. The weakenings may be provided as slits or the like of any form known to the person skilled in the art.

The predetermined weakening having the torque aNm also may be referred to as stepped predetermined weakening 8. The shear-off torque aNm is reduced as compared to the previous shear-off torque iNm+1. From the stepped predetermined weakening 8 towards the head portion 4 the torque then increases again in the first predetermined weakening 5.

An internal recess 7, for instance a hexagon socket recess, extends through the head portion 4 to the screwthreaded portion 3 positioned below the stepped predetermined weakening 8. A force transmission element 9 is to be inserted into the internal recess 7.

Figure 2:
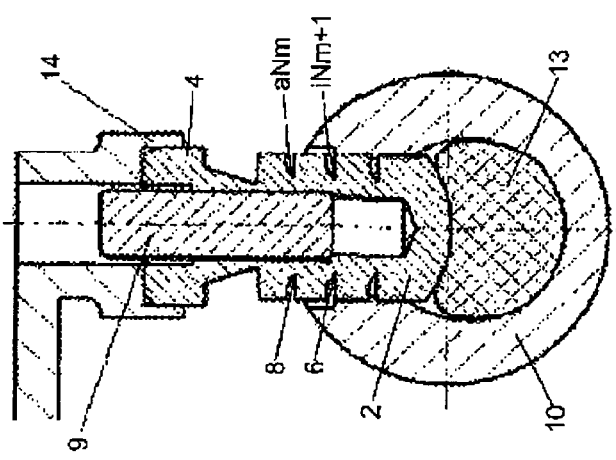
FIG. 2 shows a sectional view of the shearable fastening device in FIG. 1 with a wrench applied and the shearable fastener screwed into a bore of a conductor housing.

FIG. 2 illustrates the shearable fastening device 1 with a wrench 14 applied and the shearable fastener 2 screwed into a threaded bore of a conductor housing 10, the shearable fastener 2 clamping a conductor 13. The force transmission element 9 extends entirely into the hexagonally shaped cross section of the internal recess 7 down to the predetermined weakening 6 with the shear-off torque iNm+1 thereby bridging the stepped predetermined weakening 8 with the weakest shear-off torque aNm. The shearable fastener 2 is shown in FIG. 2 in its furthest position just before shearing while clamping the conductor 13 with the cable contacting face 11.

Figure 3:
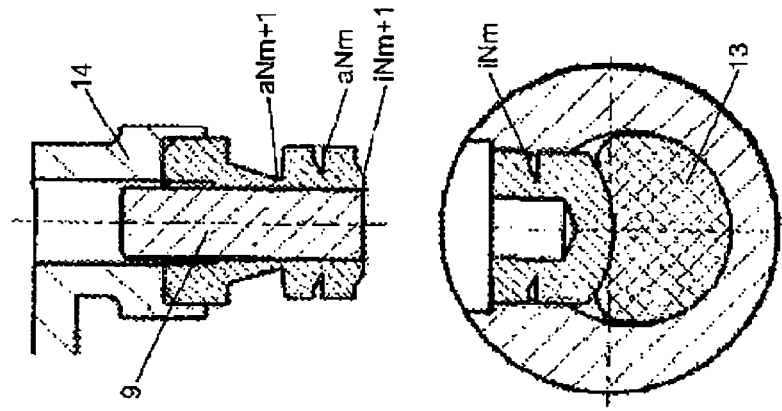
FIG. 3 shows a sectional view of the shearable fastening device in FIG. 2 with the head portion sheared off.

FIG. 3 shows the shearable fastening device 1 with the head portion 4 sheared off. As planned the shearing was not effected at the stepped predetermined weakening 8 with the weakest shear-off torque aNm but at the predetermined weakening 6 with the shear-off torque iNm+1. The remainder of the shearable fastener 2 now clamps the conductor 13 with the appropriate force.

The function of the force transmission element as part of the shearable fastening device according to the invention shall now be explained with reference to FIGS. 4 and 5.

Figure 4:
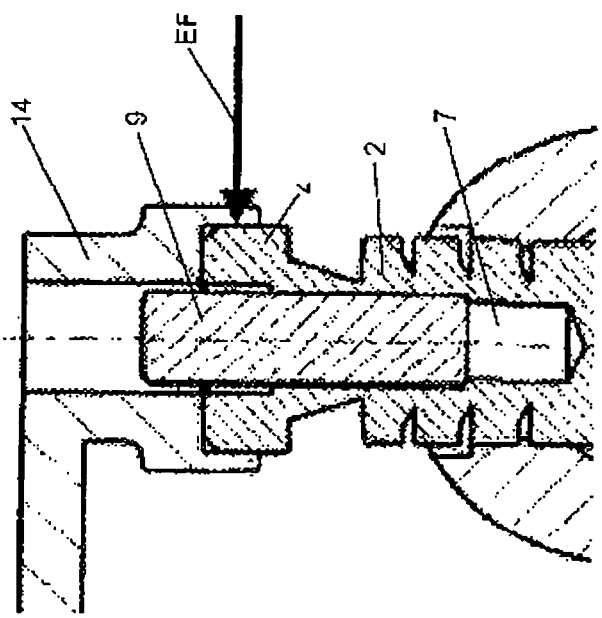
FIG. 4 shows a portion of the sectional view of the shearable fastening device in FIG. 2.

FIG. 4 shows a portion of the sectional view of the shearable fastening device in FIG. 2, i. e. the shearable fastener is in its furthest position just before shearing off the head portion 4. When screwing in the shearable fastening device 1 according to the invention, the wrench tool 14 exerts a rotational force onto the hexagonally formed head portion 4 of the shearable fastener 2, referred to as external force EF. Please note that the force transmission element 9 is entirely inserted into the internal recess 7. However, in the actual position of FIG. 4 the force transmission element 9 does not yet transmit a significant force to the shearable fastener 2.

Figure 5:
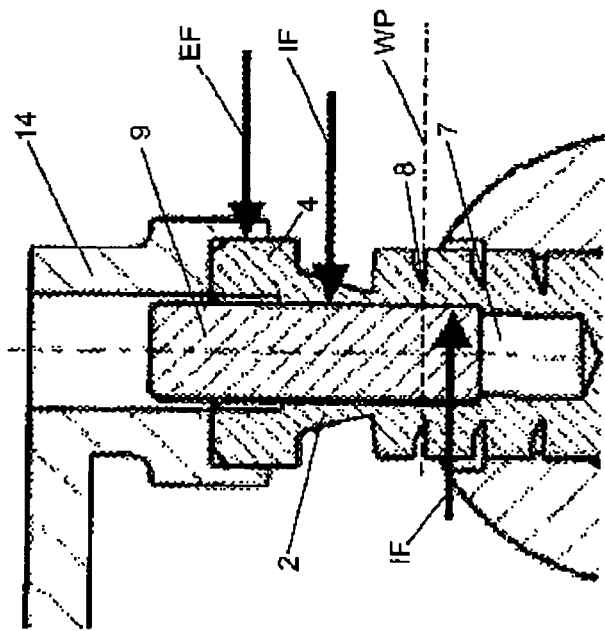
FIG. 5 also shows a portion of the sectional view of the shearable fastening device in FIG. 2.

FIG. 5 illustrates the ensuing situation, when more force is exerted on the head portion 4 via the wrench tool 14. The applied torque is now high enough that the predetermined weakening 8 with the weakest shear-off torque aNm (that means the level for small conductor cross sections) will be deformed. Depending on the degree of deformation at the predetermined weakening 8 (weakest level) the internal recess 7 of the shearable fastener 2 will get into mechanical contact with the force transmission element 9. The external force EF is now transmitted from the head portion 4 of the shearable fastener 2 to the force transmission element 9. This is referenced and illustrated by the right arrow IF in FIG. 5. At the same time the force transmission element 9 is now transmitting the internal force IF to the lower portion of the shearable fastener 2 (left arrow IF) since there is no more force closure between the head portion 4 and the lower portion (below the weakest level) of the shearable fastener 2. It must be noted that the deformation at the predetermined weakening 8 does not imply a complete shearing off at this level. Next the wrench tool 14 exerts a higher torque via the head portion 4 and the force transmission element 9 onto the lower portion of the shearable fastener 2 below the plane with the weakest shear-off torque aNm, referenced with WP, until the shear-off torque iNm+1 of the next predetermined breakaway point 6 is reached. Then the shearing off of the shearable fastener 2 takes place at the level for big conductor cross sections leaving the lower portion clamped inside the conductor housing without any projections protruding beyond its surface and the head portion 4 including the force transmission element 9 and the wrench tool 14 as two separate pieces as shown in FIG. 3.

Figure 8:
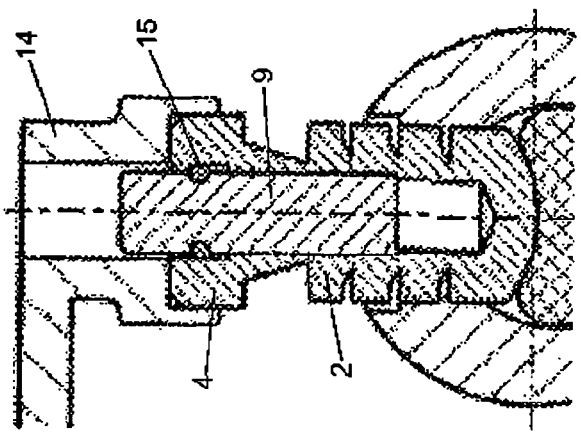
FIG. 8 shows a sectional view of the shearable fastening device in FIG. 7 with a wrench applied and the shearable fastener screwed into a bore.
Figure 7:
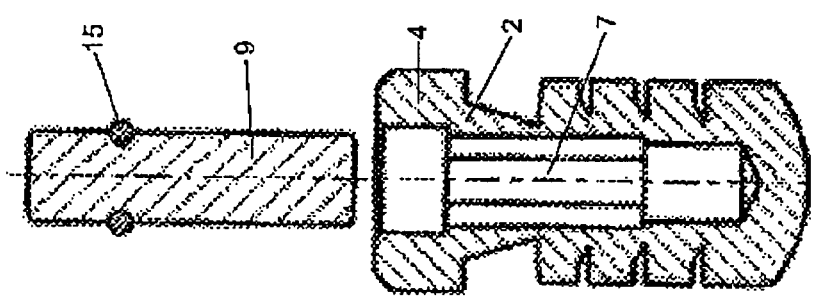
FIG. 7 shows a sectional view of the second embodiment of the shearable fastening device according to the invention with the force transmission element not being inserted into the internal recess.
Figure 6:
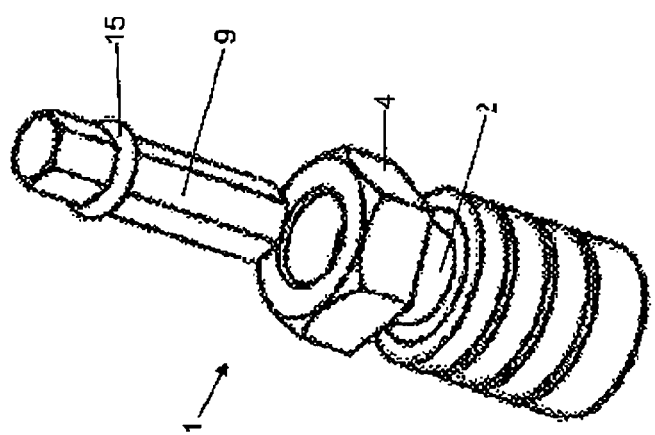
FIG. 6 shows a perspective view of a second embodiment of the shearable fastening device according to the invention with the force transmission element not being inserted into the internal recess.

FIGS. 6, 7 and 8 illustrate a second embodiment of the shearable fastening device according to the invention. At the perimeter of the force transmission element 9 there is provided a holding element 15, in the depicted embodiment made of an elastomer ring. The holding element 15 ensures that the shearable fastening device according to the invention cannot fall apart, i.e. that the force transmission element 9 and the shearable fastener 2 form a unit when packed, delivered and applied. Thus the optimal functionality of the shearable fastening device according to the invention is always guaranteed.

With the present invention a shearable fastening device has been provided which is easy and flexible to use and at the same time provides an optimal clamping and shearing functionality for a wide variety of different cross-sections of cable conductors.

The invention claimed is:

1. A shearable fastening device comprising:
   a shearable fastener having a plurality of screwthreaded portions;
   a head portion, onto which a rotational force is applicable and which is connected to the screwthreaded portions via a first predetermined weakening; and
   further predetermined weakenings in the form of cross-section constrictions are provided between the screwthreaded portions, as well as an internal recess,
   wherein the internal recess extends from the head portion at least into the region of the predetermined weakenings,
   wherein at least one stepped predetermined weakening is formed by its shear-off torque (aNm) that is smaller than the torque (iN+1) of the next predetermined weakening further away from the head portion, and the shear-off torque (aNm+1) at the next predetermined weakening closer to the head portion is also larger with respect to the shear-off torque (aNm) of said at least one stepped predetermined weakening, wherein shear-off torques of other predetermined weakenings on said screwthreaded portion not adjacent to said stepped predetermined weakening, each increase continuously in the direction of the head portion, and
   wherein said shearable fastening device further comprises a force transmission element that is insertable into the internal recess of the shearable fastener,
   and on said force transmission element or in the internal recess of the shearable fastener, there is located a holding element, made of metal or plastic and fastened with fixing means selected from the group consisting of a thread, a sealant and an adhesive, said holding element securing the position of said force transmission element in the internal recess of the shearable fastener and that the force transmission element in the inserted condition extends from the head portion into the internal recess such that the force transmission element bridges the stepped predetermined weakening when the rotational force is transmitted onto the head portion of the shearable fastener.

2. The shearable fastening device according to claim 1, wherein the head portion of the shearable fastener comprises a tool engagement surface.

3. The shearable fastening device according to claim 1, wherein the internal recess of the shearable fastener in a region extending from the head portion and the force transmission element each comprise a cross section for an optimal force transmission between each other, preferably a hexagonal cross section.

4. The shearable fastening device according to claim 1, wherein the distance between the predetermined weakenings is arbitrary.

5. The shearable fastening device according to claim 1, wherein the shearable fastener comprises three to ten, predetermined weakenings, at least one of which is constructed as a stepped predetermined weakening.

6. The shearable fastening device according to claim 2, wherein the tool engagement surface is in the form of a hexagon head.

7. The shearable fastening device according to claim 2, wherein the head portion of the shearable fastener is in the form of a hexagon head.

8. The shearable fastening device according to claim 3, wherein the force transmission element each comprise a cross section for an optimal force transmission between each other in a hexagonal cross section.

9. The shearable fastening device according to claim 5, wherein the shearable fastener comprises four to eight predetermined weakenings.

* * * * *